(12) United States Patent
Breitfuss et al.

(10) Patent No.: US 10,569,209 B2
(45) Date of Patent: Feb. 25, 2020

(54) FLAT FILTER ELEMENT AND FILTER DEVICE

(71) Applicant: Mahle International GmbH, Stuttgart (DE)

(72) Inventors: Karl Breitfuss, Bleiburg (AT); Tobias Heck, Stuttgart (DE); Sven A. Kaiser, Winnenden (DE); Stefan Kaiser, Remseck (DE); Ruediger Knauss, Kernen i.R. (DE); Marc Schuller, Winnenden (DE); Georg Votteler, Backnang (DE)

(73) Assignee: Mahle International GmbH (DE)

( * ) Notice: Subject to any disclaimer, the term of this patent is extended or adjusted under 35 U.S.C. 154(b) by 190 days.

(21) Appl. No.: 15/532,096

(22) PCT Filed: Nov. 25, 2015

(86) PCT No.: PCT/EP2015/077658
§ 371 (c)(1),
(2) Date: May 31, 2017

(87) PCT Pub. No.: WO2016/087283
PCT Pub. Date: Jun. 9, 2016

(65) Prior Publication Data
US 2017/0266602 A1    Sep. 21, 2017

(30) Foreign Application Priority Data

Dec. 1, 2014  (DE) .................. 10 2014 224 549

(51) Int. Cl.
*B01D 29/07* (2006.01)
*B01D 53/04* (2006.01)
(Continued)

(52) U.S. Cl.
CPC ....... *B01D 46/521* (2013.01); *B01D 46/0005* (2013.01); *B01D 46/10* (2013.01);
(Continued)

(58) Field of Classification Search
CPC ........ B01D 29/07; B01D 53/04; B01D 46/00; B01D 39/00; B01D 39/60; B01D 46/521;
(Continued)

(56) References Cited

U.S. PATENT DOCUMENTS 5,620,505 A * 4/1997 Koch ................. B01D 46/0024
                                                                    210/493.3
5,879,423 A    3/1999 Luka et al.
(Continued)

FOREIGN PATENT DOCUMENTS

CN    1538869 A    10/2004
DE    19508534 A1   9/1996
(Continued)

OTHER PUBLICATIONS

English abstract for EP-0900585.
(Continued)

*Primary Examiner* — Minh Chau T Pham
(74) *Attorney, Agent, or Firm* — Fishman Stewart PLLC

(57) ABSTRACT

A flat filter element for filtering a fluid may include a filter body made up of a folded filter material. The filter element may also include a circumferential edge and a side edge running in a circumferential direction along the circumferential edge. The side edge may have at least one strip portion, running along the side edge, with a side strip that may be separate from the filter body and arranged on the filter body. The side edge may also have at least one adhesive portion running along the side edge for sealing the
(Continued)

filter body. The at least one adhesive portion may be formed by gluing of least two folds, adjacent along the side edge, in a region of the side edge.

20 Claims, 2 Drawing Sheets

(51) Int. Cl.
*B01D 46/00* (2006.01)
*B01D 39/00* (2006.01)
*B01D 46/10* (2006.01)
*B60H 3/06* (2006.01)
*B01D 46/52* (2006.01)

(52) U.S. Cl.
CPC .... *B01D 2265/026* (2013.01); *B01D 2265/04* (2013.01); *B01D 2279/60* (2013.01); *B60H 3/06* (2013.01)

(58) Field of Classification Search
CPC .............. B01D 46/0005; B01D 46/10; B01D 2265/026; B01D 2279/60; B01D 2275/206; B01D 2265/024; B01D 2265/04; B60H 3/06
USPC ...... 55/385.3, 495, 493, 499, 502, 509, 521, 55/DIG. 28, DIG. 30; 123/198 E
See application file for complete search history.

(56) References Cited

U.S. PATENT DOCUMENTS

| | | | | |
|---|---|---|---|---|
| 5,902,361 | A * | 5/1999 | Pomplun ................ | B01D 46/10 55/385.3 |
| 6,217,627 | B1 * | 4/2001 | Vyskocil ............ | B01D 46/0005 123/198 E |
| 6,267,796 | B1 * | 7/2001 | Schottmer .......... | B01D 46/0005 55/385.3 |
| 6,312,489 | B1 * | 11/2001 | Ernst .................. | B01D 46/0005 55/385.3 |
| 6,699,348 | B2 * | 3/2004 | Hugert .................. | B01D 29/111 156/242 |
| 8,075,658 | B2 * | 12/2011 | Volkmer ............ | B01D 46/0005 55/497 |
| 8,668,756 | B2 * | 3/2014 | Zou ........................ | B01D 46/10 55/490 |
| 8,685,130 | B2 * | 4/2014 | Nelson ............... | B01D 46/0005 55/521 |
| 2004/0035096 | A1 | 2/2004 | Ham | |
| 2004/0172926 | A1 * | 9/2004 | Meierhoeffer ..... | B01D 46/0002 55/495 |
| 2008/0110146 | A1 * | 5/2008 | Germain ............ | B01D 46/0005 55/385.3 |
| 2011/0023427 | A1 * | 2/2011 | Srinivasan ........... | F02M 35/024 55/385.3 |
| 2012/0317938 | A1 * | 12/2012 | Sullivan ................. | B01D 46/18 55/354 |
| 2014/0260143 | A1 * | 9/2014 | Kaiser .................... | B01D 46/10 55/501 |
| 2015/0040527 | A1 * | 2/2015 | Cho ................... | F02M 35/0201 55/481 |
| 2015/0135665 | A1 * | 5/2015 | Bayerlein .......... | B01D 46/0006 55/482 |

FOREIGN PATENT DOCUMENTS

| | | |
|---|---|---|
| DE | 20112440 U1 | 12/2001 |
| DE | 10058478 A1 | 5/2002 |
| DE | 202005015911 U1 | 12/2005 |
| EP | 0900585 A1 | 3/1999 |
| WO | WO-97/23360 A1 | 7/1997 |
| WO | 03/013695 A1 | 2/2003 |

OTHER PUBLICATIONS

English abstract for DE-202005015911.
Chinese Office Action dated Jun. 25, 2019 for copending application No. 201580064459.0.

* cited by examiner

FLAT FILTER ELEMENT AND FILTER DEVICE

CROSS-REFERENCE TO RELATED APPLICATIONS

This application claims priority to International patent application Ser. No. PCT/EP2015/077658, filed on Nov. 25, 2015, and German Patent Application No. DE 10 2014 224 549.4, filed on Dec. 1, 2014, the contents of both of which are hereby incorporated by reference in their entireties.

TECHNICAL FILED

The present invention relates to a flat filter element for filtering a fluid, and a filter device having a filter element of this type, and a filter housing of a filter device of this type.

BACKGROUND

For cleaning a gas or respectively a liquid, usually filter devices come into use, which have a filter element for this purpose. In a variety of applications, the use of flat filter elements is desired and/or necessary here. Such filter elements can have a filter body of a filter material, which is folded.

For sealing the filter element or respectively the filter body, it is conceivable to glue adjacent folds along a circumferential edge of the filter body in the region of the side edge and hereby to achieve a corresponding sealing of the filter element.

A disadvantage here is that the filter element or respectively the filter body are hereby relatively unstable. Consequently, during the mounting into the associated filter device, in particular during installation into the associated filter housing, the filter element can be damaged.

The present invention is therefore concerned with the problem of indicating for a flat filter element of the type mentioned in the introduction, and for an associated filter device and an associated filter housing, improved or at least different embodiments, which are distinguished in particular by an increased stability.

This problem is solved according to the invention by the subjects of the independent claims. Advantageous embodiments are the subject of the dependent claims.

SUMMARY

The present invention is based on the general idea of sealing the side edge of a flat filter element of at least one adhesive portion, which is formed by the gluing of at least two folds of a filter body, adjacent along the side edge, and of at least one strip portion with a separate side strip from the filter body. Here, through the at least one adhesive portion, a simplified sealing of the filter element is achieved, whilst the at least one strip portion leads to an improved stability of the filter element. Hereby, the filter element is stabilized with a comparatively simple production and a low weight.

In accordance with the idea of the invention, the flat filter element has the filter body, which is produced from a folded filter material. The filter element has along its circumferential edge the side edge, running in circumferential direction, which has at least one such adhesive portion, running along the side edge, and at least one such strip portion running along the side edge. Here, the adhesive portion is formed by the gluing of at least two adjacent folds along the side edge in the region of the side edge, whilst the strip portion has a side strip, separate from the filter body and arranged on the filter body.

Generally, it is conceivable that the respective strip portion also has two or more such side strips, which can be arranged respectively spaced apart from one another or can contact one another. Here, at least two such side strips can run in an overlapping manner, at least in certain areas. This means in particular that one of the side strips can be arranged at least in certain areas on the side, facing away from the filter body, of another such side strip.

The filter element serves for the filtering of a fluid and can come into use in any desired applications. The filter element can be used, for example, in a filter device, in particular of a vehicle, for example for the filtering of fresh air in an air conditioning system for a vehicle interior, or in a fresh air system or respectively intake system for an internal combustion engine.

The filter element is constructed so as to be flat. This means that the filter element is constructed so as to be considerably greater in a longitudinal direction than in a vertical direction running transversely to the longitudinal direction. Here, the filter element can be constructed so as to be for example at least five times greater in longitudinal direction than in vertical direction. In addition, the filter element can be constructed at least five times greater in a transverse direction running transversely to the longitudinal direction and transversely to the vertical direction, than in vertical direction.

In preferred embodiments, such a side strip has a guide portion cooperating with an associated guide structure of a filter housing of the filter device. In particular, the guide portion serves the purpose of guiding the filter element during installation into and/or respectively dismantling from an associated filter housing. Variants are also conceivable, in which by means of the guide structure and of the guide portion a fixing of the filter element in the filter housing is realized.

In preferred variants, the guide portion of the side strip projects over the filter body transversely to the circumferential direction. This means in particular that the guide portion projects over the filter body in vertical direction. Hereby, a simplified guidance of the filter element into the associated filter housing of the filter device and/or the removal of the filter element from the filter housing is achieved.

For guiding and/or fixing the filter element in the filter housing, the guide portion and/or the guide structure can be constructed or respectively configured as desired. For example, configurations are conceivable in which a protruding pin of the guide portion cooperates with a corresponding guide structure of the filter housing. A reverse configuration is also conceivable.

Embodiments are advantageous, in which the guide portion of the filter element and the guide structure of the filter housing cooperate by the key/lock principle. Therefore, it can be ensured in particular that only filter elements which are coordinated with the filter housing are able to be inserted into the filter housing. Hereby, it is therefore prevented in particular that incorrect or respectively unsuitable filter elements can be mounted into the filter housing. Consequently, impairments to the function of the filter device, caused by the use of incorrect filter elements, can be prevented, or a risk to that effect can be at least reduced.

The key-lock principle between the guide portion and the guide structure can be realized in any desired manner. For example, the cooperation of a pin with a recess or of a plurality of pins with a plurality of recesses is conceivable.

The guide structure can be configured in any desired manner, in particular can have any desired course, in so far as a cooperation of the guide structure with the guide portion of the filter element is possible. Here, it is conceivable in particular to configure the guide structure so as to be curved. Hereby, also in the case of installation sites of the filter device which are difficult to access, a simplified mounting of the filter element into the filter housing and/or dismantling of the filter element from the filter housing can be achieved.

The combination of at least one adhesive portion and at least one strip portion of the side edge of the filter element can take place in any desired manner. Configurations are preferred here in which by a corresponding combination of at least one such adhesive portion and at least one such strip portion a sufficient stability and/or a sufficient sealing of the filter body or respectively of the filter element is guaranteed.

Embodiments are conceivable here, in which at least one such adhesive portion is interrupted along the side edge. Embodiments are likewise conceivable, in which at least one such strip portion is interrupted along the side edge. This means that such an adhesive portion or respectively such a strip portion do not necessarily extend over the entire side edge. Hereby, through a corresponding selection of adhesive portions and/or strip portions, an optimizing of the stability and/or of the sealing is possible. Here, at least one such adhesive portion and at least one such strip portion can be arranged in an adjacent manner along the side strip.

It is also conceivable that such a strip portion is arranged at least in certain areas on the side of such an adhesive portion facing away from the filter body.

The side strip applied on the filter body can be fixed on the filter body, in particular on the filter material. Such a fixing can be realized for example by a substance-to-substance bond, in particular the gluing and/or welding of the side strip with the filter body. Here, it is possible that the side strip, fixed to the filter body, additionally to the stabilizing of the filter body, seals the filter body. When such a configuration is present, the provision of an adhesive portion in the region of the side strip is therefore not compulsorily necessary for sealing. Of course, embodiments are also conceivable, in which the sealing is realized both by the strip portion or respectively the side strip and also by the adhesive portion.

Such a side strip can also be formed integrally on a seal of the filter element, which seal is produced from a plastic. In such a case, a fixing of the side strip on the filter body is not compulsorily necessary. The side strip serves here for the stabilizing of the filter body. The seal can be produced basically from any desired plastic, for example from polyurethane.

The integral formation of the side strip on the seal can be realized in any desired manner. For example, embodiments are conceivable in which the side strip is cast in the seal. Alternatively or additionally, embodiments are conceivable, in which the side strip has a perforation, which is penetrated by the sealing material of the seal.

The strip portion or respectively the side strip is preferably arranged onto the filter body in portions of the filter body in which the realization of an adhesive portion is not possible and/or is made difficult.

In advantageous variants, at least one such side strip is arranged on an oblique side of the filter body. Here, the filter body has a four-sided basic structure with respectively two filter body sides running substantially in a parallel manner along the circumferential direction, wherein at least one of the filter body sides is interrupted by such an oblique side, which runs transversely to the filter body sides.

Variants are particularly preferred here in which the side strip or respectively the strip portion extends in circumferential direction over a plurality of folds.

In further variants, at least one such strip portion extends over at least two sides of the filter body. This means that the strip portion can extend over two filter body sides and/or over one filter body side and one oblique side. In such a case, the strip portion is provided with an angle, so that it can be applied on the sides of the filter body. Hereby, the filter element can be composed of few individual parts, whereby the production of the filter element is simplified and/or becomes more favourably priced.

The respective strip portion or respectively the respective side strip can be produced from any desired material, in so far as this material is suitable for use in the filter element.

The respective side strip can be produced from a plastic, in particular from a thermoplastic plastic. It is conceivable here to produce the side strip as an extrusion part. Configurations are also to be considered, in which such a side strip is produced as an injection moulded part.

It is also conceivable to produce at least one such side strip from a non-woven material. Of course, side strips are also conceivable, which are produced from a mixture of different materials.

In preferred variants, at least one such strip portion, in particular the associated side strip, has a characterizing element. By means of the characterizing element, a characterizing and/or identification of the filter element is possible. Here, embodiments are advantageous, in which the characterizing element is produced from a metallic material. The use of a metallic material for the production of the characterizing element has in particular the advantage that the filter element can also be identified in the case of destruction, in particular in the case of a fire.

It shall be understood that in addition to such a filter element and such a filter device, also such a filter housing belongs to the scope of this invention, which is able to cooperate with such a guide portion.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically,
FIG. 1 a side view of a filter device,
FIG. 2 a top view onto a filter element,
FIG. 3 a side view of the filter element,
FIG. 4 a top view onto a filter device in section,
FIG. 5 a cross-section through the filter device,
FIG. 6 a longitudinal section through the filter device, FIG. 7 a top view onto a filter device in section, in another example embodiment.

DETAILED DESCRIPTION

Figure 1:
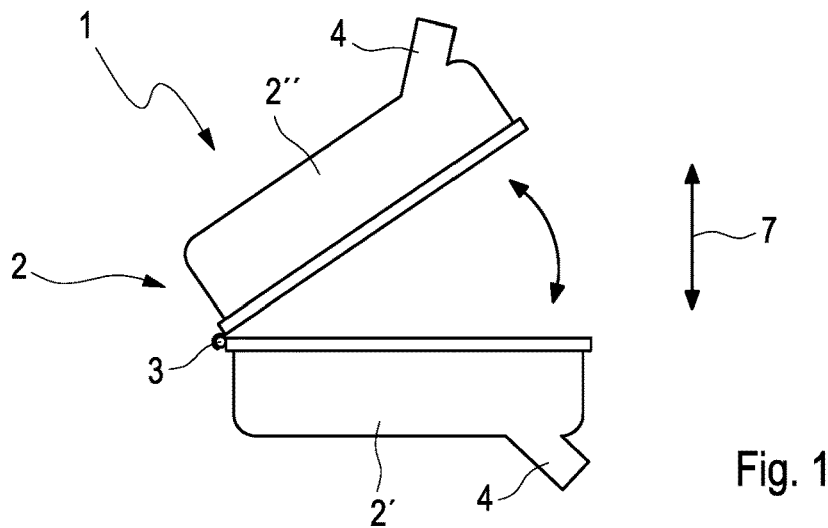

In FIG. 1 a side view is shown of a filter device 1 for filtering a fluid, for example of fresh air for an internal combustion engine, which is not shown. The filter device 1 has a filter housing 2, which is constructed in two parts and has a lower housing part 2' and an upper housing part 2". The housing parts 2', 2" are mounted against one another by means of pivot bearing 3, such that the housing 2 can be closed and opened. At the respective housing part 2', 2" a connection 4 is formed, in order to introduce into the filter device 1 the fluid which is to be filtered, or respectively to convey the filtered fluid out from the filter device 1.

Figure 2:
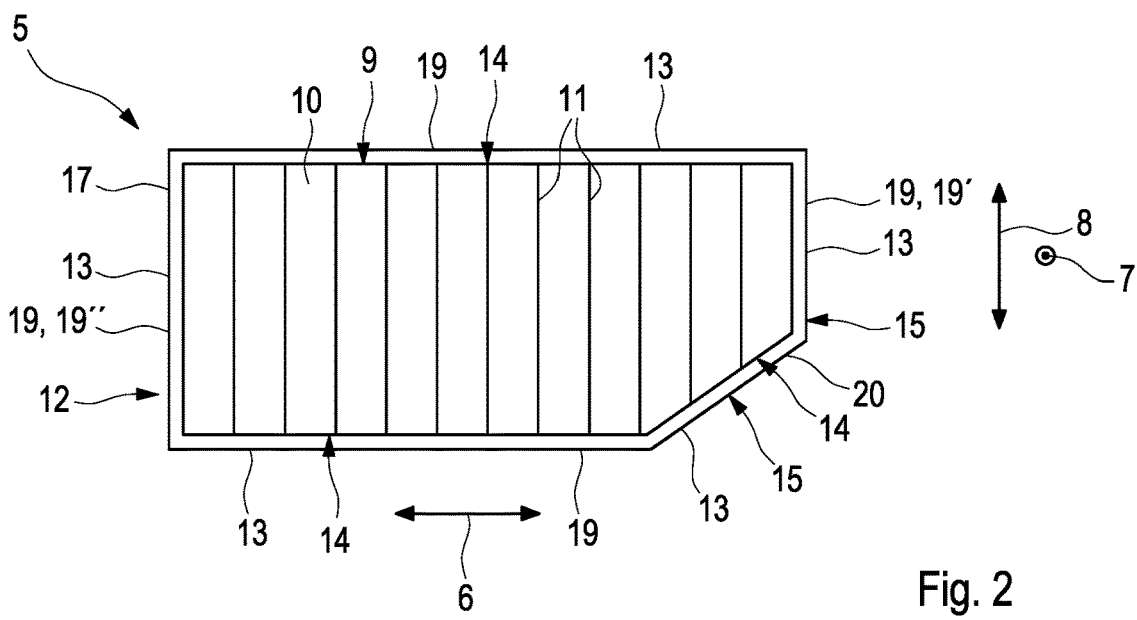
Figure 3:
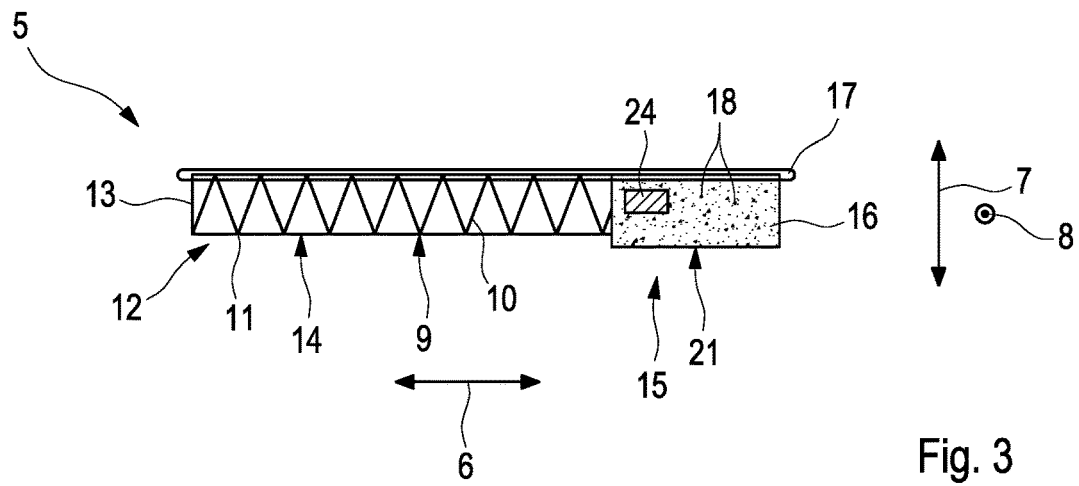

For filtering the fluid, the filter device 1 has an exchangeable filter element 5, which is shown in a top view in FIG. 2 and in a side view in FIG. 3. The filter element is constructed in a plate-like manner. This means that the filter element 5 is constructed so as to be greater in a longitudinal direction 6 than in a vertical direction 7 running transversely to the longitudinal direction 6. In addition, the filter element 5 is constructed so as to be greater in a transverse direction 8 running transversely to the longitudinal direction 6 and transversely to the vertical direction 7, than in the vertical direction 7. In addition, in the example which is shown, the filter element 5 is constructed so as to be greater in longitudinal direction 6 than in transverse direction 7, the flat filter element 5 is therefore configured in an elongate manner. The filter element 5 has a filter body 9 of a folded filter material 10. The filter material 10 is suitable for filtering the fluid which is to be filtered by the filter device 1 or respectively the filter element 5. Through the folded filter material 10, folds 11 occur in the filter body 9 which extend in transverse direction 8 and are spaced apart in longitudinal direction 6.

The filter element 5 has a side edge 12 which, as shown in FIG. 2, runs in circumferential direction along a circumferential edge 13 of the filter element 5. The side edge 12 has here at least one adhesive portion 14 for sealing the filter body 9, and at least one strip portion 15. The respective adhesive portion 14 is formed by the gluing of at least two folds 11, adjacent along the side edge 12, in the region of the side edge 12, wherein in FIG. 3 the folds 11 are illustrated in non-glued state, for better clarity. For the gluing of the folds 11, the filter body 9 can be provided in the corresponding regions with an adhesive bead, which is not visible here. It is conceivable in particular here to realize the gluing of the folds 11 in the manner of a pocket gluing, which is not shown in further detail.

The respective strip portion 15 has at least one side strip 16. The respective side strip 16 can be produced from a non-woven material or respectively from a plastic, for example by injection moulding. Here, the strip portion 15 shown in FIG. 3 has only one such side strip 16.

The filter element 5 has in addition a seal 17, which is produced from a plastic, for example from polyurethane, and runs in circumferential direction in the upper region of the filter body 9 in the vertical direction 7. Here, the side strip 16 of the strip portion 15 is formed integrally with the seal 17. For this, the side strip 16 can be cast with the seal 17. In the example which is shown, the side strip 16 has a perforation 18, which is penetrated by the material of the seal 17.

As can be seen in FIG. 2, the filter element 5 has a four-sided basic structure with respectively two filter body sides 19 running in a parallel manner along the circumferential direction. This means that the filter body 9 has two filter body sides 19, which run in transverse direction 8 in a parallel manner and spaced apart, wherein these filter body sides 19 are designated below as front face side 19' or respectively rear face side 19". The filter body 9 has in addition two filter body sites 19, running in a parallel manner in longitudinal direction 6, which are spaced apart in transverse direction 8. Here, the front face side 19' and one of the filter body sides 19 adjacent in circumferential direction are interrupted by an oblique side 20 of the filter body 9, which runs transversely to the longitudinal direction 6 and transversely to the transverse direction 8. Here, the strip portion 15 extends with the side strip 16 over the oblique side 20 and the front face side 19' of the filter body 9. For this, the side strip 16 is constructed accordingly in an angled manner.

The side strip 16 runs along the oblique side 20 over a plurality of folds 11 of the filter body 9 and is fixed on the filter body 9 along the oblique side 20, for example is glued thereto, in order to guarantee a sealing of the filter body 9 or respectively of the filter element 5. In the region of the front face side 19', a fixing of the strip portion 15 or respectively of the side strip 16 on the filter body 9 is not compulsorily necessary, in particular because the side strip 16 is formed integrally with the seal 17. Both in the region of the oblique side 20 and also in the region of the front face side 19', the strip portion 15 or respectively the side strip 16 leads to a stabilizing of the filter element 9, in particular in longitudinal direction 6.

In the region of the rear face side 19" such an adhesive portion 14 is provided, which seals the filter body 9 on the rear face side 19". Likewise, it is conceivable to provide on the rear face side 19" alternatively or additionally such a strip portion 15.

It is conceivable to additionally provide the filter body 9 with an adhesive portion 14 in the region of the oblique side 20. In this case, the strip portion 15 or respectively side strip 16 is arranged in the region of the oblique side 20 on the side of the adhesive portion 14 facing away from the filter body 9. Such an adhesive portion 14 is therefore arranged respectively on the filter body sides 19 adjacent to the strip portion 15 in circumferential direction. On the filter body side 19 lying opposite the oblique side 20 such an adhesive portion 14 is likewise provided.

The side strip 16 has a guide portion 21, which projects over the filter body 9 transversely to the circumferential direction, in vertical direction 7 in the example which is shown. Here, the filter body 9 is projected over only in the lower vertical direction 7 in the illustration of FIG. 3. In other words, the side strip 16 has a guide portion 21, which projects over the filter body 9 downwards. Hereby, the side strip 16 or respectively the guide portion 21 can cooperate with the filter housing 2.

Figure 4:
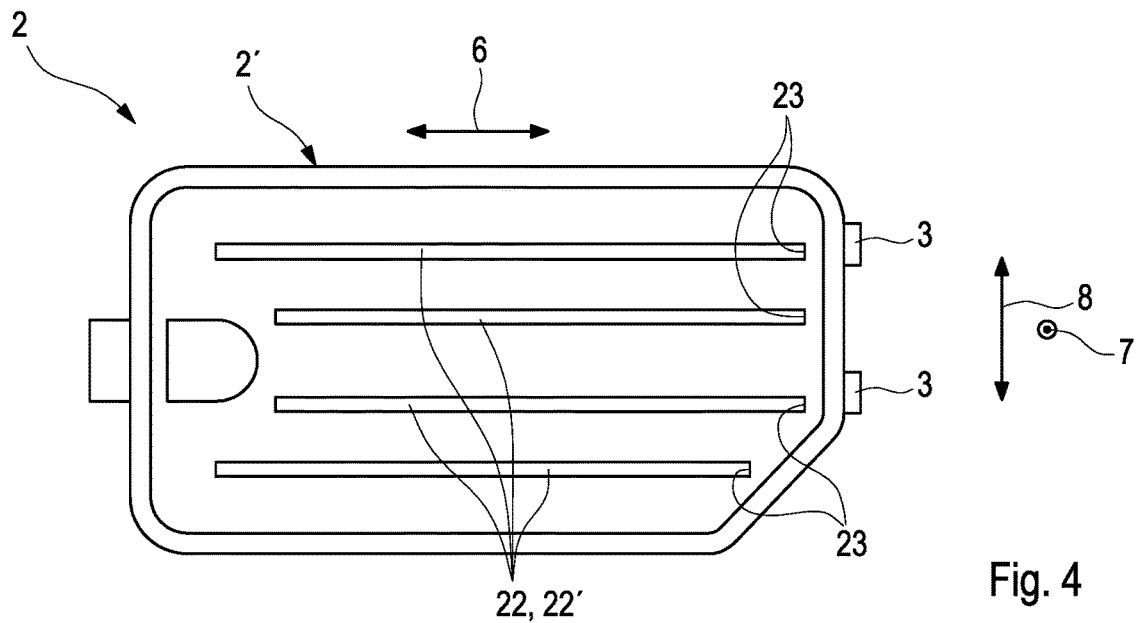

For this purpose, the filter housing 2, as illustrated in FIG. 4, has at least one complementary guide structure 22 to the guide portion 21. Here, the at least one guide structure 22 in the filter housing 2 in FIG. 4 is constructed purely by way of example in the housing lower part 2'.

Figure 5:
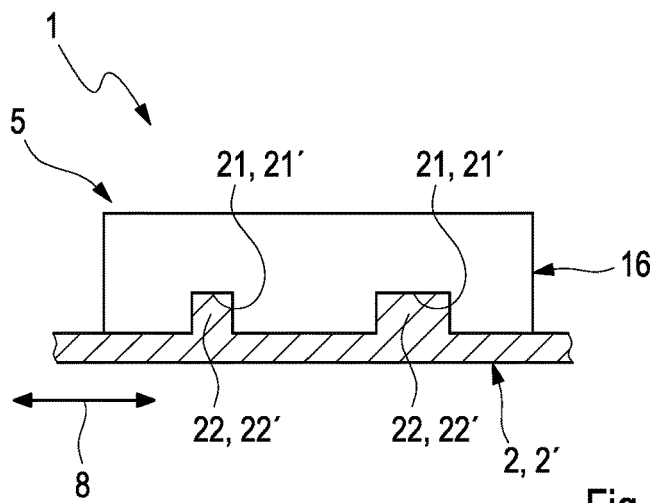

FIG. 5 shows a cross-section through the filter device 1 with the filter element 5 inserted in the filter housing 2, wherein only the side strip 16 and the housing lower part 2' can be seen. Here, the side strip 16 can be seen in the region of the front face side 19'. It can be seen that the side strip 16 in the region of the front face side 19' has two such guide portions 21, which cooperate with corresponding guide structures 22 of the housing 2. In addition, it can be seen that the guide portions 21 are configured as grooves 21', which are constructed differently. The respective groove 21 cooperates with an associated rib 22' as guide structure 22 of the housing 2. There is therefore a rib 22' matching the respective groove 21', such that the guide portions 21 and the guide structures 22 cooperate in the manner of a key-lock principle. Therefore, only filter elements 5 which are coordinated to the filter housing 2 are able to be inserted into the filter housing 2.

In FIG. 4 it can be seen that in addition to the guide structures 22 which are shown, two guide structures 22 are provided in the region of the oblique side 20, which cooperate with two corresponding guide portions 21 of the side strip 16 in the region of the oblique side 20, wherein also these guide structures 22 are constructed as ribs 22'.

By the cooperating of the guide structures 22 with the guide portions 21, it is possible in addition to guide the filter element 5 along the filter housing 2, by the guide portions 21, in particular the grooves 21', being moved along the associated guide structures 22, in particular the ribs 22'. This movement can take place here in particular in longitudinal direction 6.

Figure 6:
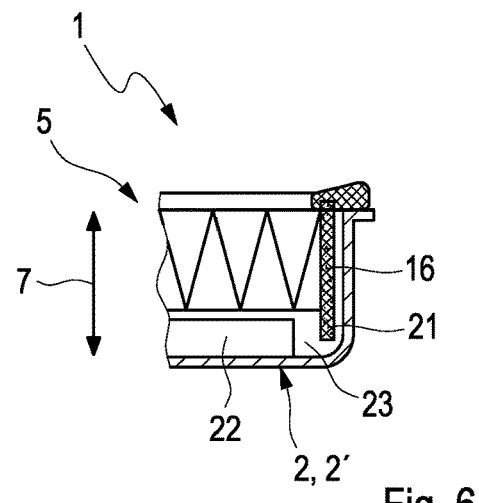

As can be seen in particular in FIG. 6, the housing 2, in particular the guide structure 22, has in an end portion of the respective guide structure 22, arranged in longitudinal direction 6, a mount 23, into which the side strip 16, in particular the guide portion 21, engages in the desired installation position of the filter element 5. This means that the filter element 5, for introducing into the filter housing 2, can be moved by means of the guide portions 21 along the guide structures 22, in order to engage with a desired installation position in to the mounts 23. Hereby, the installation of the filter element 5 into the housing 2 is considerably simplified.

Figure 7:
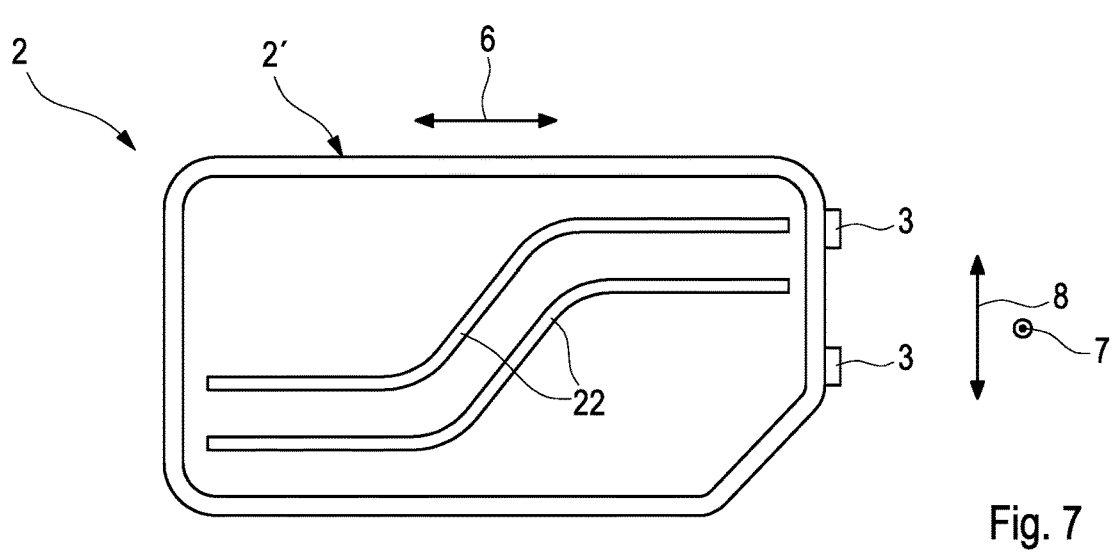

FIG. 7 shows a top view onto such a housing lower part 2' of such a housing 2 in another example embodiment. It can be seen therein that the guide structures 22 of the filter housing 2 run in a curved manner, in contrast to the guide structures 22 in FIG. 4, running substantially in a straight line in longitudinal direction 6. Hereby, an installation or respectively dismantling of the filter element 5 in the filter housing 2 is possible also in the case of a difficult installation position, through a corresponding guidance along the guide structures 22. In addition, in contrast to in FIG. 4, the filter housing 2 in FIG. 7 has only two such guide structures 22.

The side strip 16, as can be seen for example in FIG. 3, has a characterizing element 24, which serves for the characterizing of the filter element 5. Here, the characterizing element 24 is arranged on the side of the side strip 16 facing away from the filter body 9, so that it is visible from the exterior. In addition, the characterizing element 24 is produced from a metallic material, so that it can also serve for the identification of the filter element 5 in the case of damage, in particular in the case of fire.

The invention claimed is:

1. A flat filter element for filtering a fluid, comprising:
a filter body made up of a folded filter material;
a circumferential edge and a side edge running in a circumferential direction along the circumferential edge;
wherein the side edge has at least one strip portion, running along the side edge, with a side strip separate from the filter body and arranged on the filter body;
wherein the side edge has at least one adhesive portion running along the side edge for sealing the filter body, the at least one adhesive portion being formed by gluing at least two folds, adjacent along the side edge, in a region of the side edge;
wherein the filter body has a four-sided structure with two filter body sides running substantially in a parallel manner along the circumferential direction, at least one of the filter body sides is interrupted by an oblique side of the filter body running transversely to the filter body sides, and the at least one side strip is arranged on the oblique side; and
wherein the side strip has a guide portion that cooperates with an associated guide structure of a filter housing for guiding the filter element into or from the filter housing, the guide portion projecting over the filter body transverse to the circumferential direction.

2. The filter element according to claim 1, wherein the at least one adhesive portion is interrupted along the side edge.

3. The filter element according to claim 1, wherein the at least one adhesive portion and the at least one strip portion are arranged in an adjacent manner along the side strip.

4. The filter element according to claim 1, wherein at least a portion of the at least one strip portion is arranged on a side of the at least one adhesive portion facing away from the filter body.

5. The filter element according to claim 1, wherein the at least one side strip is fixed on the filter body.

6. The filter element according to claim 1, further comprising a seal produced from a plastic, wherein the at least one side strip is formed integrally with the seal.

7. The filter element according to claim 1, wherein the strip portion is provided with an angle for arranging the side strip on the filter body sides and the oblique side of the filter body.

8. The filter element according to claim 1, wherein the at least one side strip is produced from one of a non-woven material and a thermoplastic plastic.

9. The filter element according to claim 1, wherein the at least one side strip has a characterizing element, produced from a metallic material, for characterizing the filter element.

10. A filter device comprising:
a filter housing having an upper housing part and a lower housing part mounted to one another; and
a filter element arranged in the filter housing, the filter element including:
a filter body made up of a folded filter material; and
a circumferential edge and a side edge running in a circumferential direction along the circumferential edge;
wherein the side edge has at least one strip portion, running along the side edge, with a side strip separate from the filter body and arranged on the filter body;
wherein the side edge has at least one adhesive portion running along the side edge for sealing the filter body, the at least one adhesive portion being formed by gluing at least two folds, adjacent along the side edge, in a region of the side edge; and
wherein the filter body has a four-sided structure with two filter body sides running substantially in a parallel manner along the circumferential direction, at least one of the filter body sides is interrupted by an oblique side of the filter body running transversely to the filter body sides, and the at least one side strip is arranged on the oblique side.

11. The filter device according to claim 10, wherein the filter housing has a guide structure cooperating with a guide portion of the filter element for guiding the filter element at least one of into the filter housing and from the filter housing.

12. The filter device according to claim 11, wherein the guide portion and the guide structure cooperate according to a key-lock principle, such that only a filter element corresponding to the filter housing is insertable into the filter housing.

13. The filter device according to claim 11, wherein the guide structure has a curved course.

14. A filter housing of a filter device comprising an upper housing part and a lower housing part mounted to one another, and a guide structure on the lower housing part and configured to cooperate with the guide portion of the filter element according to claim 1 for guiding the filter element at least one of into the filter housing and from the filter housing.

15. The filter housing according to claim 14, wherein the guide structure is configured to cooperate with the guide portion according to a key-lock principle, such that only a filter element corresponding to the filter housing is insertable into the filter housing.

16. The filter element according to claim 6, wherein the plastic is polyurethane.

17. The filter element according to claim 1, wherein the guide portion is configured as a groove.

18. The filter device according to claim 10, wherein the at least one guide structure is configured as a rib extending at least partially in a longitudinal direction.

19. The filter device according to claim 18, wherein the at least one guide structure includes at least two ribs arranged substantially parallel with each other.

20. The filter device according to claim 10, wherein the upper housing part and the lower housing part are mounted to one another via a pivot bearing such that the upper housing part and the lower housing part are pivotable with respect to each other to open and close the filter housing.

* * * * *